2,921,065

3β-HYDROXY-5,6-DIHALO-16α,17α-EPOXY-21-BROMOPREGNAN - 20 - ONES AND DERIVATIVES THEREOF

Bjarte Loken, Sarpsborg, Norway

No Drawing. Application February 9, 1959
Serial No. 791,841

5 Claims. (Cl. 260—239.55)

The present invention relates to a novel method for the preparation of 17α,21-dihydroxyprogesterone and to intermediates used therein. A suitable starting material is a 3β - hydroxy - 5,6 - dihalo - 16α,17α - epoxy - 21-bromopregnan - 20 - one, wherein the halogen in the 5- and 6-position is preferably chlorine or bromine.

A solution of chromium trioxide in acetic acid can be employed to oxidize the 3β-hydroxy-5α,6β,21-trihalo-16α,17α-epoxypregnan-20-one. Suitable solvents are the haloalkanes, particularly polyhalomethanes or polyhaloethanes, e.g. dichloromethane, chloroform, and dichloroethane. The resulting mixture of 5α,6β,21-trihalo-16α,17α-epoxypregnane-3,20-dione and 5β,6α,21-trihalo-16α,17α-epoxypregnene-3,20-dione thus obtained is converted to a mixture of the 6α-halo and 6β-halo derivatives of 21-acyloxy-16α,17α-epoxy-4-pregnene-3,20-dione of the structural formula

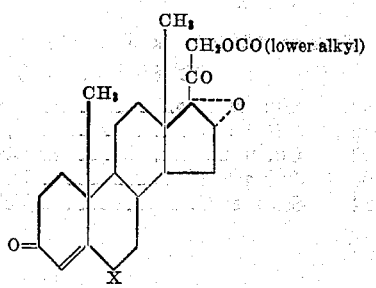

wherein X is halogen, by heating with an alkali metal alkanoate derived from such lower alkanoic acids as acetic, propionic, butyric, pentanoic, or hexanoic acids. The reaction can be carried out in an inert organic solvent such as a lower alkanone, e.g. acetone, butanone, or pentanone. This epoxide is then treated with anhydrous hydrogen halide in a lower alkanoic acid solvent to yield a 6,16β-dihalo-17α-hydroxy-21-acyloxy-4-pregnene-3,20-dione wherein there is an admixture of the 6α and 6β-halo derivatives. The latter is triturated in a lower alkanoic acid solvent in the presence of a suitable catalyst, preferably Raney nickel. In this manner there are obtained the 17α-hydroxy-21-acycloxyprogesterones, which are known and useful intermediates for the preparation of adrenocorticoid hormones.

The invention will appear more fully from the following examples which are given only for purposes of illustration and are not to be construed as limiting the invention in spirit or in scope. Quantities are indicated as parts by weight.

Example 1

A solution of 2.8 parts of sodium hydroxide in aqueous methanol is added portionwise to a solution of 45 parts of 3β,17α - dihydroxy - 5α,6β,16β,21 - tetrabromopregnan-20-one in 200 parts of methanol. Water is added to the solution and the 3β-hydroxy-5α,6β,21-tribromo-16α,17α-epoxypregnan-20-one, which precipitates, is recovered by filtration. Upon recrystallization from ethanol, the product melts at about 124–126° C. and has the specific optical rotation of −28° in chloroform.

A solution of 4 parts of chromium trioxide in a mixture of 10 parts of water and 25 parts of acetic acid is added portionwise to a solution of 15 parts of 3β-hydroxy - 5α,6β,21 - tribromo - 16α,17α - epoxypregnan-20-one in a mixture of 300 parts of acetic acid and 134 parts of dichloromethane. During this addition the temperature is maintained below 10° C. The mixture is then allowed to reach room temperature and water is added to precipitate the product which is collected on a filter and recrystallized from a mixture of dichloromethane and methanol to yield 5α,6β,21-tribromo-16α,17α-epoxypregnane-3,20-dione decomposing at about 114° C., and having the specific optical rotation of −31° in chloroform. This product is an admixture with the 5β,6α,21-tribromo isomer.

Example 2

A solution of 7.5 parts of 5α,6β,21-tribromo-16α,17α-epoxypregnane-3,20-dione in 120 parts of acetone is refluxed in the presence of 12.5 parts of anhydrous potassium acetate for 3 hours. Water is added and the oily precipitate is extracted with dichloromethane. The extract is washed with water, dried over anhydrous potassium carbonate, filtered, and evaporated to give 6-bromo - 16α,17α - epoxy - 21 - acetoxy - 4 - pregnene-3,20-dione which has the specific optical rotation of +42° in chloroform. The compound is obtained as an oil.

Substitution of 16.1 parts of potassium butyrate for the potassium acetate in the preceding procedure yields the oily 6-bromo-16α,17α-epoxy-21-butyroxy-4-pregnene-3,20-dione.

Example 3

For about 15 minutes 5 parts of 6-bromo-16α,17α-epoxy - 21 - acetoxy - 4 - pregnene - 3,20 - dione is stirred in a 1:5 mixture of hydrogen bromide in acetic acid. The solution is then poured into an excess of water and the precipitate thus obtained is recovered by filtration. The 6,16β - dibromo - 17α - hydroxy - 21 - acetoxy - 4-pregnene-3,20-dione has the specific optical rotation of +24° in chloroform.

Substitution of 6.5 parts of 6-bromo-16α,17α-epoxy-21-butyroxy-4-pregnene-3,20-dione for the 6-bromo-16α,-17α-epoxy-21-acetoxy-4-pregnene-3,20-dione in the preceding procedure yields 6,16β-dibromo-17α-hydroxy-21-butyroxy-4-pregnene-3,20-dione.

Example 4

The 6,16β - dibromo - 17α - hydroxy - 21 - acetoxy-4-pregnene-3,20-dione obtained in the preceding example is dissolved in methanol and the solution is stirred for about 24 hours in the presence of Raney nickel. The reaction mixture is filtered and the filtrate is concentrated to a small volume to induce crystallization. The precipitate is collected on a filter and recrystallized from acetone to yield 17α-hydroxy-21-acetoxy-4-pregnene-3,20-dione melting at about 235–238° C. The specific optical rotation is about +133° in chloroform.

Substitution of an equimolar amount of 6,16β-dibromo-17α - hydroxy - 21 butyroxy - 4 - pregnene - 3,20 - dione for the 6,16β-dibromo-17α-hydroxy-21-acetoxy-4-pregnene-3,20-dione in the preceding paragraph yields white, crystalline 17α - hydroxy - 21 - butyroxy - 4 - pregnene-3,20-dione.

Example 5

To a mixture of 15 parts of 3β,17α-dihydroxy-5α,6β-dichloro-16β,21-dibromopregnan-20-one in 67 parts of methanol is added portionwise a solution of 1 part of sodium hydroxide in aqueous methanol. Upon the addition of water, there precipitates the 3β-hydroxy-5α,6β- dichloro - 16α,17α - epoxy - 21 - bromopregnan - 20-one which is collected on a filter and recrystallized from 2-propanol.

While the temperature is maintained below 5° C., a solution of 1.3 parts of chromium trioxide in a mixture of 3.3 parts of water and 8 parts of acetic acid is added portionwise to a cold solution of 5 parts of 3β - hydroxy - 5α,6β - dichloro - 16α,17α - epoxy - 21-bromopregnan-20-one in a mixture of 100 parts of acetic acid and 35 parts of chloroform. The solution is then warmed to room temperature. Water is added, whereupon there precipitate the white, prismatic crystals of 5α,6β - dichloro - 16α,17α - epoxy - 21 - bromopregnane-3,20-dione which are recovered by filtration and recrystallized from a mixture of ethanol and chloroform.

*Example 6*

A mixture of 4 parts of anhydrous sodium acetate and 2.5 parts of 5α,6β - dichloro - 16α,17α - epoxy - 21-bromopregnane-3,20-dione in 40 parts of benzene is refluxed for four hours. The water is added and the resulting precipitate is extracted with chloroform, washed with water, dried over anhydrous sodium sulfate, filtered, and evaporated to yield 6 - chloro - 16α,17α-epoxy - 21 - acetoxy - 4 - pregnene - 3,20 - dione.

A solution of 1.2 parts of 6 - chloro -16α,17α-epoxy-21-acetoxy-4-pregnene-3,20-dione in a 20% hydrogen bromide solution in acetic acid is poured into an excess of water. The precipitate thus obtained is collected on a filter to yield 6-chloro-16β-bromo-17α-hydroxy-21-acetoxy-4-pregnene-3,20-dione. Dehalogenation with Raney nickel by the procedure of Example 4 yields 17α - hydroxy - 21 - acetoxy - 4 - pregnene - 3,20-dione melting at about 236–239° C.

What is claimed is:

1. 5α,6β,21 - tribromo - 16α,17α - epoxypregnane-3,20-dione.

2. A compound of the structural formula

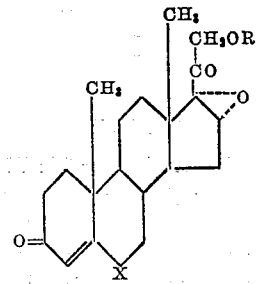

wherein R is a radical of the structural formula —CO— (lower alkyl) and X is a radical of the class consisting of chlorine and bromine.

3. 6 - bromo - 16α,17α - epoxy - 21 - acetoxy - 4-pregnene - 3,20 - dione.

4. A compound of the structural formula

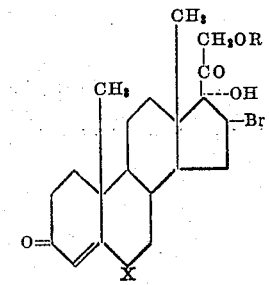

wherein R is a radical of the structural formula —CO— (lower alkyl) and X is a radical of the class consisting of chlorine and bromine.

5. 6,16β - dibromo - 17α - hydroxy - 21 - acetoxy-4-pregnene-3,20-dione.

References Cited in the file of this patent
UNITED STATES PATENTS

| | | |
|---|---|---|
| 2,602,769 | Murray et al. | July 8, 1952 |
| 2,789,989 | Julian et al. | Apr. 23, 1957 |
| 2,811,522 | Cutler | Oct. 29, 1957 |
| 2,816,108 | Julian et al. | Dec. 10, 1957 |
| 2,874,154 | Stork et al. | Feb. 17, 1959 |